Dec. 2, 1958 H. T. MAYO 2,862,320
BUBBLE PRODUCING DEVICE
Filed Jan. 16, 1956 2 Sheets-Sheet 1

INVENTOR.
HAROLD T. MAYO
BY R.W. Hodgson

Dec. 2, 1958    H. T. MAYO    2,862,320
BUBBLE PRODUCING DEVICE
Filed Jan. 16, 1956    2 Sheets-Sheet 2
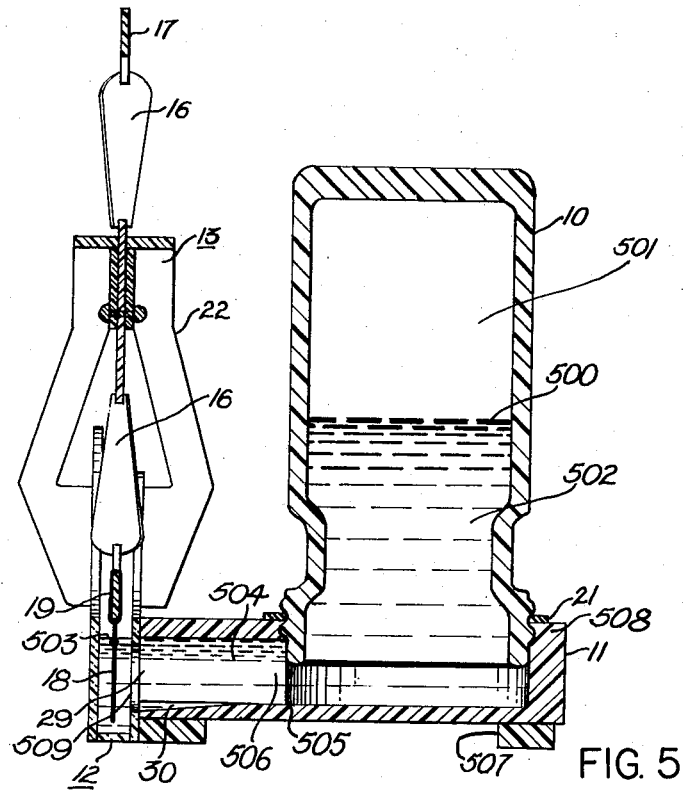
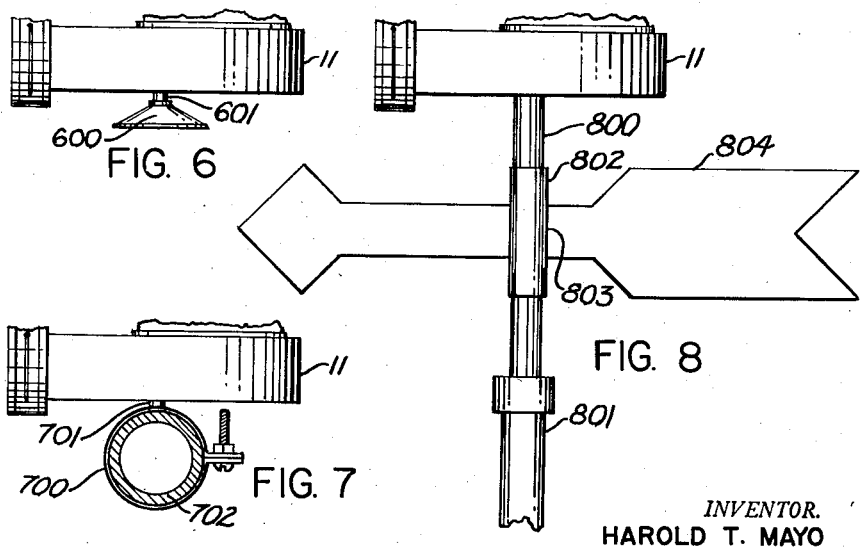
INVENTOR.
HAROLD T. MAYO
BY R.W. Hodgson

United States Patent Office 2,862,320
Patented Dec. 2, 1958

2,862,320

BUBBLE PRODUCING DEVICE

Harold T. Mayo, Biloxi, Miss., assignor of one-tenth to Gadget-Of-The-Month Club, Inc., Los Angeles, Calif., a corporation of California Application January 16, 1956, Serial No. 559,350

3 Claims. (Cl. 40—106.23)

Generally speaking, the present invention is related to apparatus capable of producing bubbles. Such apparatus is not only suitable as toys for children but also is adapted for use in connection with commercial establishments for advertising purposes. More particularly, the present invention is directed toward a new type of bubble producing apparatus responsive to wind currents for producing and for releasing from the apparatus a plurality of air bubbles.

It is an object of the present invention to provide a new and useful bubble producing device responsive to an air stream for generating and for separating from the apparatus itself a plurality of bubbles.

It is an additional object of the present invention to provide a new and useful bubble producing device the bubble making fluid contents of which are not subject to inadvertent spilling, despite possible subjection of the device to substantial shock, vibration, and movement.

It is still a further object of the present invention to provide a new and useful bubble producing device in which the bubble producing fluid will maintain a relatively constant level, within selectable limits, in the region of loading by the fluid of one or a plurality of bubble containers or loops.

According to the present invention, a plurality of air vanes are fixedly disposed and rotatably displaceable about a common axis. Associated with the air vanes and rotatable therewith is a support member or ring the periphery of which is provided with a plurality of outwardly protruding loop elements. The air vanes in response to an air stream of appropriate magnitude will be caused to rotate about their common axis so that the bubble producing loops may pass selectively through a novel feeder trough, so as to obtain therein a film of bubble fluid. By novel construction of the apparatus, the level of the bubble fluid in the feeder trough will remain substantially constant or within selectable limits for all fluid levels of a fluid well associated therewith, so that for substantially all fluid levels of the fluid well the loops will be assured of obtaining a complete bubble fluid film thereover.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 5 is a cross-sectional view of the apparatus in Figures 2 and 4.

Figures 6 through 8 illustrate various types of mounting of the bubble producing apparatus of the present invention.

Figure 1:
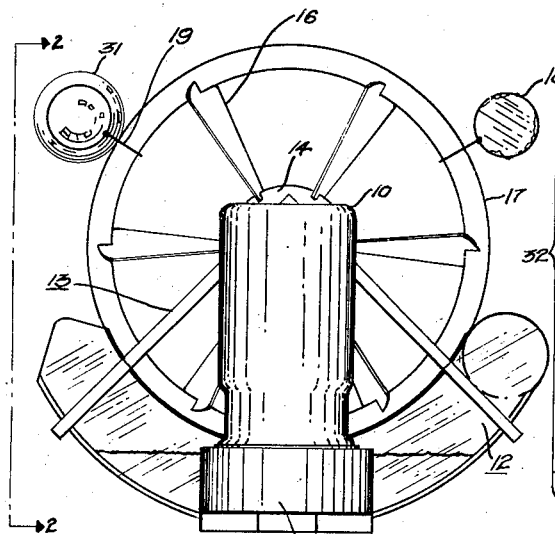
Figure 1 is a rear elevational view of a bubble producing device according to the present invention.
Figure 2:
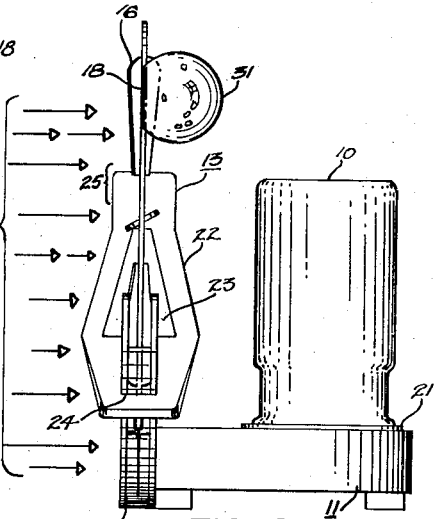
Figure 2 is a side elevational view of the apparatus of Figure 1 along the line 2—2 in Figure 1.
Figure 3:
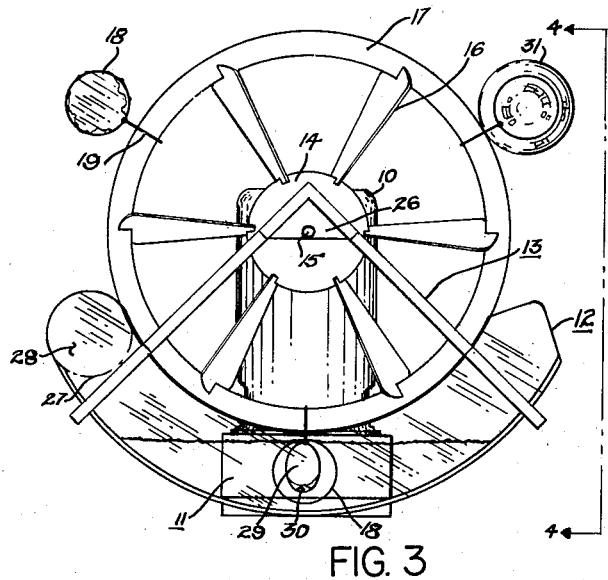
Figure 3 is a view of the front of the apparatus of Figures 1 and 2.

Figure 1 through Figure 4, discussed concurrently for sake of clarity, include a fluid well 10, a novel base member 11, a feeder trough 12 affixed to base member 11, a support member 13 affixed either to the feeder trough as shown (or to the base member), a disc 14 rotatably affixed to support member 13 by means of axial pin or shaft 15, a plurality of air vanes 16 affixed to and extending radially from disc 14, a ring member 17 affixed to air vanes 16 at the outwardly protruding ends thereof, and a plurality of loop elements 18 provided with base portions 19 affixed to ring member 17. Fluid well 10 is shown to have a threaded end portion 20 which may be selectively screwed or fitted into base member 11. Sealing ring 21 may be provided to accommodate the inter-cooperation of fluid well 10 and base member 11 so that the bubble fluid will be precluded from leaking out of base member 11 about the periphery of fluid well 10. Support member 13 is composed of at least two support elements 22 having vane admittance apertures 23 and trough mounting slots 24. Mounting elements 22 are affixed at the upper end portions 25 thereof to each other by means of shaft block 26. Feeder trough 12 has a U-shaped cross section and may preferably have the inner side portion thereof cut away as is indicated by the line 27 in Figure 3 so that the bubble films may be exposed gradually to the outside air and yet find some protection in circular area 28 (of the nearest side of feeder trough 12 to the viewer). Base member 11 is provided with outlet aperture or orifice 29 cooperating with inlet aperture 509 of feeder trough 12, which may, if desired, have a sloped bottom area 30 so as to enhance fluid flow into feeder trough 12. Bubble 31 in Figures 2 and 4 and also in Figures 1 and 3 is shown to be almost completely formed just prior to its release from its associated loop by the force acting thereon by air stream 32. Bubble 18 in Figure 3 on the other hand has just emerged from feeder trough 12 so that the bubble is just commencing to form.

Figure 4:
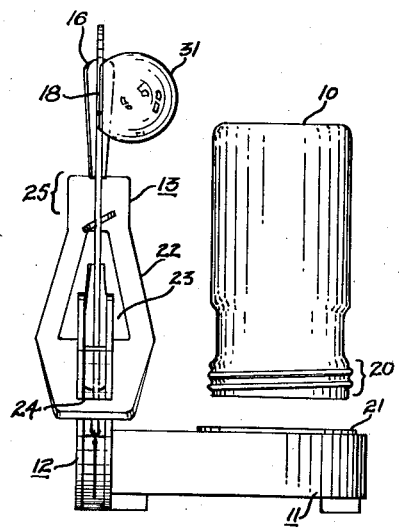
Figure 4 is a side elevational view taken along the line 4—4 in Figure 3 and is similar to Figure 2 in all respects with the exception that the fluid well is shown exploded or removed from the rest of the apparatus.

Figure 5 shows in cross section the apparatus of Figure 2. To fill the fluid well 10 in Figure 5 with bubble fluid having appropriate surface tension qualities, one merely inverts the apparatus shown in Figure 5 and releases the fluid well 10 therefrom, as shown in Figure 4. Fluid well 10 is next filled and, with the apparatus in the inverted disposition, fluid well 10 is threaded into well receiving portion 508 of base member 11 with sealing ring 21 cooperating therewith to form a liquid seal so as to prevent leakage of the bubble fluid between the threads of fluid well 10 and the threaded portion of base member 11. When the apparatus of Figure 5 is reinverted to assume its disposition shown in Figure 5, fluid level 500 drops an appreciable amount, thus leaving a volume 501 within fluid well 10 of reduced air pressure. Fluid 502 flows down into base member 11 and into feeder trough 12 to reach a level 503 so that loop 18 will be completely immersed in the fluid within the lower region of feeder trough 12. As the apparatus is operated by a suitable air stream, an amount of bubble fluid will be used so as to reduce progressively level 503 so as to reach perhaps level 504. But even at this level, the loop 18 will still be immersed completely in the fluid. Should the fluid level tend to be reduced below level 504, a quantity of air from the exterior well be caused to proceed through feeder trough 12 and through base member 11 to proceed under lip 505 and ultimately appear in volume 501. The increased air pressure in volume 501 will cause level 500 in fluid well 10 to be reduced and to increase fluid level 504 back to fluid level 503. Thus, loops 18 in passing through feeder trough 12 will always be completely immersed in bubble fluid, until of course fluid level 500 in fluid well 10 is reduced to a level below fluid 504, at which time refilling of fluid well 10 will be necessitated. If desired, the protrusion of lip 505 of fluid well 10 into fluid channel 506 may be reduced so as to decrease the degree of fluid level fluctuation between fluid levels 503 and 504. However, regardless of the particular design chosen, an essential feature of the present invention is that for all fluid levels 500 within fluid well 10, loops passing through feeder trough 12 will be completely immersed in the bubble fluid and yet, even immediately after completely refilling fluid well 10, level 503 in feeder trough 12 will be restricted in height by virtue of the external air pressure so that the fluid will not be caused to spill out of the end regions of feeder trough 12.

Should the design of the apparatus in Figure 5 be such that feeder trough 12 extends slightly below the bottom of base member 11, then support block 507 may be included at the bottom rear of base member 11 should the device be desired to be placed on a horizontal plane surface.

Figure 6 illustrates that if it is desired, suction cup means 600 or a plurality of same may be employed together with mounting pin 601 to mount the device on the hood of an automobile which is to be used in a parade, for example.

Figure 7 illustrates that a conventional clamp 700 may be associated with pin 701 so as to mount the apparatus upon handlebar 702 of a bicycle or tricycle.

The apparatus of the present invention may also be mounted to a permanent structure such as a home or commercial building, as shown in Figure 8, by means of a rod 800 affixed to base member 11 and a bearinged support rod 801 cooperating with rod 800. If desired, rod 800 may be slotted and provided with a slotted sleeve 802 so as to accommodate the placement through slot 803 of arrow 804. Bearinged rod 809 will of course be mounted upon the structure for which the apparatus is provided.

Numerous modifications and variations of the present invention will occur to those skilled in the art after a careful study hereof. All such, properly within the basic spirit and scope of the present invention are intended to be included and comprehended herein as fully as if specifically described, illustrated and claimed herein.

The embodiments of the present invention specifically relative positionings, and cooperative relationships of the various component parts of the present invention are not critical, and can be modified substantially within the spirit of the present invention.

The embodiments of the nearest invention specifically described and illustrated herein are exemplary only, and are not intended to limit the scope of the present invention, which is to be interpreted in the light of the prior art and the appended claims only, with due consideration for the doctrine of equivalents.

I claim:

1. Fluid supply apparatus adapted to supply fluid to a bubble producing device of the type including air stream responsive multiple film-aperture means constrained for rotational displacement about a central axis fixedly disposed with respect thereto and adapted to maintain the fluid supplied to such air stream responsive multiple film-aperture means between a predetermined maximum and minimum level each exceeding the transverse dimension of any one of the apertures in such an air stream responsive multiple film-aperture means, comprising: a horizontal base member having an interiorly disposed substantially entirely horizontally directed fluid channel portion, a vertically directed fluid well receiving portion open at the top thereof and communicating with said horizontal fluid channel adjacent one end thereof and a transverse fluid outlet adjacent the other end of said fluid channel portion; a downwardly directed fluid well having a downwardly open end portion releasably secured within said upwardly open fluid well receiving portion of said base member, said downwardly directed open end portion of said fluid well protruding downwardly into one end of said fluid channel portion a discrete distance and determining a minimum level of fluid within said fluid channel portion corresponding to the horizontal level of the lower end of said downwardly opened end portion of said fluid well; and a feeder trough of substantially narrow U-shaped cross section and, in a direction perpendicular to said cross section, being of upwardly curved configuration so as to define an annular ring segment having an upwardly open interior U-shaped recess therein adapted to cooperate with and receive therethrough in succession an air stream responsive multiple film-aperture means constrained for rotational displacement about a central axis fixedly disposed above said trough, the vertical depth of the U-shaped recess within said trough at the bottom of the curvature thereof being a least as great as the vertical depth of said fluid channel portion, said feeder trough having a transverse aperture in the rear thereof adjacent the lowermost portion of the curvature of the annular ring segment and being affixed to said base member with said transverse fluid inlet in direct horizontal communication with said transverse fluid outlet of said base member and with the top of the U-shaped recess in the trough at the bottom of the curvature of said annular ring segment being positioned above the top of said fluid channel portion communication therewith whereby a maximum and a minimum level of fluid within said U-shaped recess in said feeder trough is determined and is maintained, said minimum fluid level height within said U-shaped recess in said feeder trough being greater than the vertical dimension of an individual aperture of an air stream responsive multiple film-aperture means adapted to be rotated arcuately through said curved U-shaped feeder trough.

2. Fluid supply apparatus adapted to supply fluid to a bubble producing device of the type including air stream responsive multiple film-aperture means constrained for rotational displacement about a central axis fixedly disposed with respect thereto and adapted to maintain the fluid supplied to such air stream responsive multiple film-aperture means between a predetermined maximum and minimum level each exceeding the transverse dimension of any one of the apertures in such an air stream responsive multiple film-aperture means, comprising: a horizontal base member having an interiorly disposed substantially entirely horizontally directed fluid channel portion, a vertically directed fluid well receiving portion open at the top thereof and communicating with said horizontal fluid channel adjacent one end thereof and a transverse fluid outlet adjacent the other end of said fluid channel portion; a downwardly directed fluid well having a downwardly open end portion releasably secured within said upwardly open fluid well receiving portion of said base member, said downwardly directed open end portion of said fluid well protruding downwardly into one end of said fluid channel portion a discrete distance and determining a minimum level of fluid within said fluid channel portion corresponding to the horizontal level of the lower end of said downwardly opened end portion of said fluid well; a resilient sealing ring sealingly positioned between said downwardly directed end portion of said fluid well and said upwardly directed fluid well receiving portion of said base member; adjusting means providing vertical adjustment of the extent of downward protrusion of the open downwardly directed end portion of said fluid well within said fluid channel portion of said base member; and a feeder trough of substantially narrow U-shaped cross section and, in a direction perpendicular to said cross section, being of upwardly curved configuration so as to define an annular ring segment having an upwardly open interior U-shaped recess therein adapted to cooperate with and receive therethrough in succession an air stream responsive multiple film-aperture means constrained for rotational displacemental about a central axis fixedly disposed above said trough, the vertical depth of the U-shaped recess within said trough at the bottom of the curvature thereof being at least as great as the vertical depth of said fluid channel portion, said feeder trough having a transverse aperture in the rear thereof adjacent the lowermost portion of the curvature of the annular ring segment and being affixed to said base member with said transverse fluid inlet in direct horizontal communication with said transverse fluid outlet of said base member and with the top of the U-shaped recess in the trough at the bottom of the curvature of said annular ring segment being positioned above the top of said fluid channel portion communication therewith whereby a maximum and a minimum level of fluid within said U-shaped recess in said feeder trough is determined and is maintained, said minimum fluid level height within said U-shaped recess in said feeder trough being greater than the vertical dimension of an individual aperture of an air stream responsive multiple film-aperture means adapted to be rotated arcuately through said curved U-shaped feeder trough.

3. A bubble producing device, comprising: a horizontal base member having an interiorly disposed substantially entirely horizontally directed fluid channel portion, a vertically directed fluid well receiving portion open at the top thereof and communicating with said horizontal fluid channel adjacent one end thereof and a transverse fluid outlet adjacent the other end of said fluid channel portion; a downwardly directed fluid well having a downwardly open end portion releasably secured within said upwardly open fluid well receiving portion of said base member, said downwardly directed open end portion of said fluid well protruding downwardly into one end of said fluid channel portion a discrete distance and determining a minimum level of fluid within said fluid channel portion corresponding to the horizontal level of the lower end of said downwardly opened end portion of said fluid well; air stream responsive multiple film-aperture means consisting of; a central disc having a center of rotation, a plurality of air vanes affixed to said central disc and extending outwardly therefrom in radial directions, a ring member disposed about and affixed to said air vanes, and a plurality of outwardly protruding loop elements affixed to said ring member and each defining film-aperture means; a feeder trough of substantially narrow U-shaped cross section, and, in a plane perpendicular to said cross section, being of upwardly curved configuration so as to define an annular ring segment having an upwardly open interior U-shaped recess therein adapted to cooperate with and receive therethrough in succession said air stream responsive multiple film-aperture means, the vertical depth of the U-shaped recess within said trough at the bottom of the curvature thereof being at least as great as the vertical depth of said fluid channel portion, said feeder trough having a transverse aperture in the rear thereof adjacent the lowermost portion of the curvature of the annular ring segment and being affixed to said base member with said transverse fluid inlet in direct horizontal communication with said transverse fluid outlet of said base member and with the top of the U-shaped recess in the trough at the bottom of the curvature of said annular ring segment being positioned above the top of said fluid channel portion communication therewith whereby a maximum and a minimum level of fluid within said U-shaped recess in said feeder trough is determined and is maintained, said minimum fluid level height within said U-shaped recess in said feeder trough being greater than the vertical dimension of an individual aperture of said multiple air stream responsive film-aperture means adapted to be rotated arcuately through said curved U-shaped feeder trough; support means for mounting said air stream responsive multiple film-aperture means above said base member and consisting of; first and second support elements and a block element, said support elements each having a mounting slot adapted to cooperate fixedly with said feeder trough, a vane admittance aperture contiguous with said mounting slot, and an end portion, said support elements being mounted upon said feeder trough and being angularly related with respect to each other, said block element being fixedly interposed between said support elements in the region of said end portion thereof; and a shaft rotatably mounting said disc, in the region of said center of rotation, to said block element.

References Cited in the file of this patent

UNITED STATES PATENTS

| | | |
|---|---|---|
| 1,633,880 | Ahlrichs | June 28, 1927 |
| 1,741,050 | Dennis et al. | Dec. 24, 1929 |
| 2,311,207 | Bussey | Feb. 16, 1943 |
| 2,412,732 | Holman | Dec. 17, 1946 |
| 2,452,794 | Saachy | Nov. 2, 1948 |
| 2,574,117 | Ludwig | Nov. 6, 1951 |
| 2,618,237 | McDermott et al. | Nov. 18, 1952 |
| 2,690,280 | Hennignsen | Sept. 28, 1954 |